United States Patent
Bushmitch et al.

(10) Patent No.: US 11,734,606 B2
(45) Date of Patent: Aug. 22, 2023

(54) METHOD FOR PREDICTING OPERATIONAL EFFECTIVENESS

(71) Applicant: The Government of the United States, as represented by the Secretary of the Army, Washington, DC (US)

(72) Inventors: Dennis Bushmitch, Somerset, NJ (US); Richard Cozby, Bel Air, MD (US)

(73) Assignee: The Government of the United States as represented by the Secretary of the Army, Washington, DC (US)

( * ) Notice: Subject to any disclaimer, the term of this patent is extended or adjusted under 35 U.S.C. 154(b) by 507 days.

(21) Appl. No.: 16/911,443

(22) Filed: Jun. 25, 2020

(65) Prior Publication Data

US 2020/0327452 A1 Oct. 15, 2020

Related U.S. Application Data

(62) Division of application No. 14/499,297, filed on Sep. 29, 2014, now Pat. No. 10,733,525.

(51) Int. Cl.
*G06N 20/00* (2019.01)

(52) U.S. Cl.
CPC .................................. *G06N 20/00* (2019.01)

(58) Field of Classification Search
CPC ........ G06N 99/005; G06N 20/00; G06N 3/08; G06F 15/18; G06F 19/345; G06K 9/00771
See application file for complete search history.

(56) References Cited

U.S. PATENT DOCUMENTS

| 6,549,646 | B1 * | 4/2003 | Yeh | G06V 30/244 |
| | | | | 382/199 |
| 2015/0248768 | A1 * | 9/2015 | Garnavi | G06T 7/11 |
| | | | | 382/180 |
| 2016/0344770 | A1 * | 11/2016 | Verma | H04L 51/42 |

* cited by examiner

*Primary Examiner* — Li Wu Chang
(74) *Attorney, Agent, or Firm* — Euclid Woo (57) ABSTRACT

Various embodiments are described that relate to an adaptive learning system. The adaptive learning system can be trained by correlation between a first set of raw technical performance data and a set of actual operational effectiveness assessment data. Once trained, the adaptive learning system can be deployed. Once deployed, the adaptive learning system can produce a set of predicted operational effectiveness assessment data from a second set of raw technical performance data that is different from the first set of raw technical performance data.

2 Claims, 10 Drawing Sheets

METHOD FOR PREDICTING OPERATIONAL EFFECTIVENESS

CROSS-REFERENCE

This application is a divisional application of, and claims priority to, U.S. application Ser. No. 14/499,297 filed on Sep. 29, 2014. U.S. application Ser. No. 14/499,297 is hereby incorporated by reference.

GOVERNMENT INTEREST

The innovation described herein may be manufactured, used, imported, sold, and licensed by or for the Government of the United States of America without the payment of any royalty thereon or therefor.

BACKGROUND

A vast amount of information can be made available to decision makers. The value of this information can be based, at least in part, on the ability of those decision makers to understand that information and make determinations based on the understanding of the information. If the decision makers misunderstand the information, then incorrect decisions can be made. Depending on the importance of these decisions lives can be at risk.

SUMMARY

In one embodiment, a method comprises obtaining a set of raw technical performance data. The method also comprises predicting, by way of a learning system, a set of predicted operational assessment data based, at least in part, on the set of raw technical performance data. The learning system can be trained from a set of training technical performance data and a set of training operational assessment data.

In one embodiment, a computer-implemented method comprises accessing a set of raw technical performance data. In addition, the computer-implemented method comprises accessing a set of actual operational effectiveness data. Further, the computer-implemented method comprises training an adaptive learning system based on a relationship between at least part of the set of raw technical performance data and the set of actual operational effectiveness data.

In one embodiment, a method comprises predicting a first operational score for a first individual service by way of a first service adaptive learning system. The method also comprises predicting a second operational score for a second individual service by way of a second service adaptive learning system that is distinct from the first service adaptive learning system. Additionally, the method comprises predicting an overall operational effectiveness though use of an operational adaptive learning system, where the overall operational effectiveness is based, at least in part, on the first operational score and the second operational score.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Before a major decision is made it can be beneficial to predict the outcome of the decision and/or predict operational effectiveness of a system associated with the system. Aspects disclosed herein can be used in making a successful prediction of operational performance factors of complex systems. In order to make a successful prediction a trained learning system can be employed. The learning system can understand a relationship between technical performance data (e.g., instrument provided information) and operational effectiveness assessment data (e.g., calculated information).

In one example, a manufacturing process can be used to create bottled soda with a desired taste. Taste testers can be employed to provide the operational effectiveness assessment data that taste soda with slightly different mixture percentages that are technical performance data. The following hypothetical data table could be produced:

| Water to powder mixture | Significant deviation of taste |
|---|---|
| 89.5% water, 10.5% powder | Yes |
| 89.6% water, 10.4% powder | Yes |
| 89.7% water, 10.3% powder | Yes |
| 89.8% water, 10.2% powder | No |
| 89.9% water, 10.1% powder | No |
| 90% water, 10% powder | No |
| 90.1% water, 9.9% powder | No |
| 90.2% water, 9.8% powder | No |
| 90.3% water, 9.7% powder | Yes |
| 90.4% water, 9.6% powder | Yes |
| 90.5% water, 9.5% powder | Yes |

Based on the technical performance data (water to powder mixture) and the operational effectiveness assessment data (significant deviation of taste) a relationship can be that when the water to powder mixture is ±0.2 from 90-10 the taste deviation is not significant. The learning system can be trained with this relationship and then deployed. Actual water to power mixture information can be fed to the learning system and based on this the learning system can make a direct prediction (e.g., if the customers will be able to taste a different) or an indirect prediction (e.g., if the product will be successful). This prediction can be used. In one example if the prediction is that customers will be able to taste a difference, then a batch can be discarded while if the prediction is that the customers will not be able to taste the difference, then the batch can be bottled, packaged, and shipped.

In addition, the trained learning system can be adaptive. Continuing with the soda making example, as customer feedback is obtained the trained learning system can be modified, removed, fortified, etc. In one example, if product complaints are made from actual customers for soda that are plus or minus 0.3 (89.7-10.3 or 90.3-9.7) have taste variation, then the learning system can change based on new information. Aspects disclosed herein can be practiced in a wide variety of areas, including but not limited to manufacturing, communications, military, business, computing, finance, etc.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components. Aspects disclosed herein can be performed by at least one component (e.g., a trainer component, a validation component, etc.).

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs including separate applications or code from dynamically linked libraries.

Figure 1:
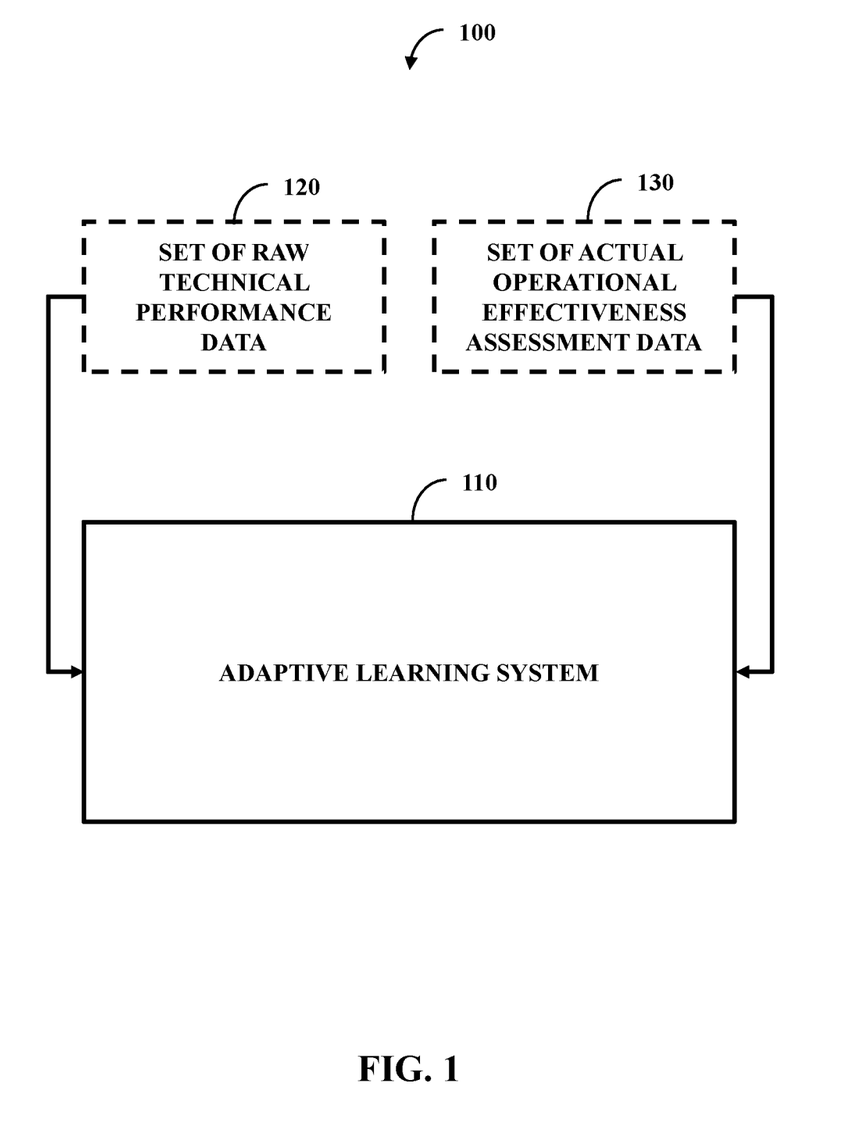
FIG. 1 illustrates one embodiment of an environment comprising an adaptive learning system subjected to training.

FIG. 1 illustrates one embodiment of an environment 100 comprising an adaptive learning system 110. The environment can be used to train the learning system 110. A set of raw technical performance data 120 and a set of actual operational effectiveness assessment data 130 can be used to train the adaptive learning system 110. The set of raw technical performance data 120 can be hardware instrumentation data (e.g., packet performance data), condition data (e.g., signal to noise ratios, interference levels, etc.), etc. and can be provided to the adaptive learning system 110.

In one example, a soldier can carry a backpack with a global positioning system (GPS). This backpack can include a data recorder that records a location of the soldier at certain intervals (e.g., once per second). Further, the backpack can include a transmission system that transmits the location of the soldier, at the intervals, wirelessly to a central processing system. What is actually received by the central processing system may not be completely accurate. For example, data packets may be lost between the transmission system and the central processing system and therefore complete information is not provided to the central processing system.

What is actually received by the central processing system (e.g., what position information is actually received) can be compared with the data recorder. Based on this comparison an accuracy level of the transmission system can be computed. The set of raw technical performance data 120 can be what the central processing system actually receives while the set of actual operation effectiveness assessment data 130 can be the accuracy level. A correlation can be made that when information is sent from the backpack (e.g., the actual tested backpack, a backpack of that type, etc.) the information will be delivered with the accuracy level. This correlation can be used to train the adaptive learning system 110.

In addition to training the adaptive learning system 110, the training can be validated. In one example, the set of raw technical performance data can be divided into halves—a training half and a validation half. The training half can be used to train the adaptive learning system 110 and the validation half can be used to validate the adaptive learning system 110 after being trained. This can be done since it can be known how the adaptive learning system 110 should respond since the set of actual operational effectiveness assessment data 130 is available.

In one embodiment, the adaptive learning system 110 is a deep learning system of at least five layers. The layers of the deep learning system can be distinct or subsequent layers can be combined previous layers. Example deep learning system can be a Convolutional Neural Network or a Deep Belief Network.

In one embodiment, once the adaptive learning system 110 is deployed the adaptive learning system 110 can continue to be trained and/or validated. This training of the adaptive learning system 110 can occur online (e.g., while the adaptive learning system 110 is functioning) or offline (e.g., when the adaptive learning system 110 is non-functioning until a session of subsequent training is finished). Additionally, how successfully the adaptive learning system 110 functions can be used to initially or subsequently train other adaptive learning systems.

Figure 2:
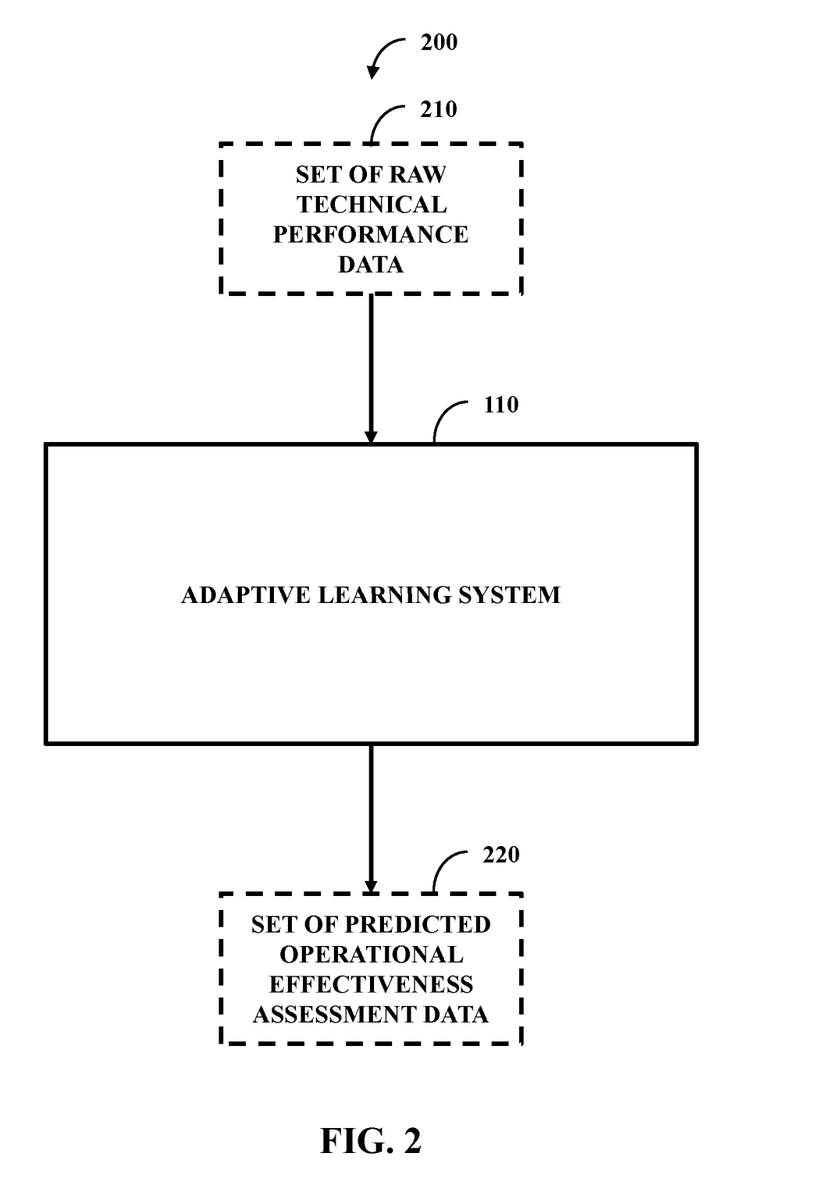
FIG. 2 illustrates one embodiment of an environment comprising the adaptive learning system in its deployed phase of operations.

FIG. 2 illustrates one embodiment of an environment 200 comprising the adaptive learning system 110. While the environment 100 of FIG. 1 can be considered as training the adaptive learning system 110 the environment 200 can be considered how the adaptive learning system 110 functions after being initially trained and subsequently deployed.

Returning to the above example with GPS, a soldier can be deployed with the backpack that transmits position information. This transmitted position information can function as the set of raw technical performance data 210. While access to the transmitted positional information can be available, access to the data recorder may not be possible in a reasonable timeframe. Therefore, the adaptive learning system 110 can make a prediction on accuracy of the transmitted position information. This prediction can function as the set of predicted operational effectiveness assessment data 220. As shown in this example, the set of training technical performance data (e.g., the set of raw technical performance data 120 of FIG. 1) can be of a first classification (e.g., transmitted data) and of a second classification (e.g., data recorder data) while the set of raw technical performance data 210 can be of the first classification and not of the second classification.

While relatively simply concepts are discussed above, it is to be appreciated by one of ordinary skill in the art that far more complex predictions can be performed by a highly robust adaptive learning system 110. Different sets and types of data can populate the set of raw technical data 210, such as data from different hardware elements, different systems, etc. Similarly, the set of predicted operational effectiveness assessment data 220 can be more robust with various levels of predictions, types of predictions, confidences in predictions, etc.

Figure 3:
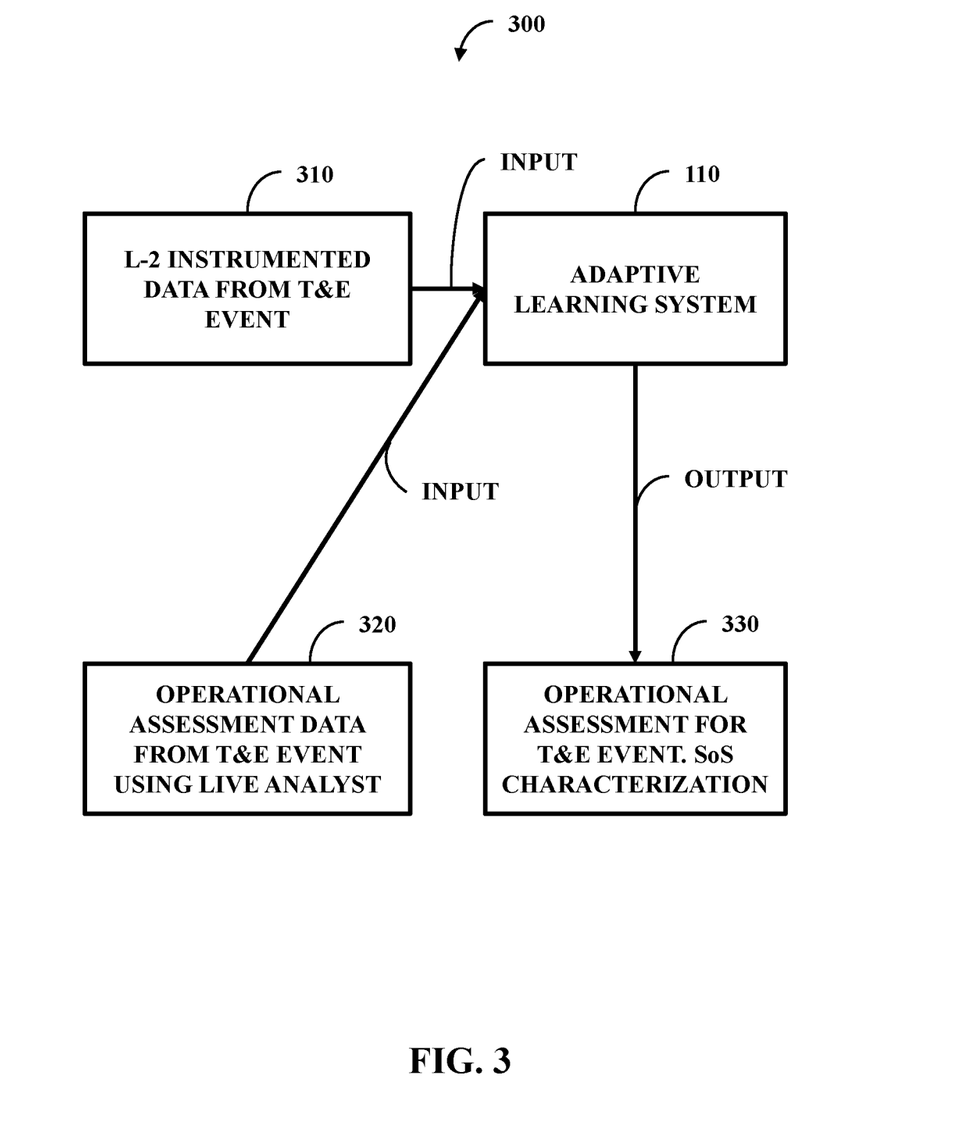
FIG. 3 illustrates one embodiment of an environment comprising the adaptive learning system during both, training and deployment phases of operation.

FIG. 3 illustrates one embodiment of an environment 300 comprising the adaptive learning system 110. The environment 300 shows instrumented data from a testing and evaluation (T&E) event 310 that can be considered raw instrumented data that is provided to the adaptive learning system 110. In addition, operational assessment data 320 from the T&E event (e.g., provided by human evaluators/event assessors) can be inputted into the adaptive learning system 110. The operational assessment data 320 can be available for a subset (less than a full set) of a test's duration (e.g., partial time). The output from the adaptive learning system 110 can be a system of systems (SoS) characterization 330 for a full set of the test's duration and/or for a remaining duration. The instrumented data 310 collection and characterization 330 can occur from full event durations while the assessment data 320 collection can take place at a fraction of event duration. Use of adaptive learning system 110 can greatly reduce event evaluation costs, by eliminating human evaluators for the entire event duration. Human evaluators can be used for an initial phase which provides training and validating data for the adaptive learning system.

The adaptive learning system 110, such as a deep learning architecture, can learn complex relationships between multi-dimensional spaces of various functions including unsupervised learning and proactive (e.g., automated) classification capabilities of highly complex data sets. The deep learning architecture and algorithms can be used to determine operational performance of applications and services as well as system of system network formation. This architecture can be trained at various times including continuous time training (e.g., prepared for training anytime) or infrequent time training.

In some scenarios it may be beneficial to have a repeatable, automated capability to evaluate emerging technologies with specific emphasis on a particular sector of interest (e.g., auto manufacturing technologies for an automotive company). One manner to evaluate these technologies is to develop measures of performance that are highly creatable with operational performance. These measures of performance can be interpolated to develop system threshold and objective technical performance specifications. Development of these measures of performance can require an individual with both sound judgment and significant scientific knowledge. When individuals such as this are in short supply a system can be used to develop these measures of performance. This system, however, may prove to be very costly and testing can be complex.

Aspects disclosed herein can be practiced for quick analysis of operational performance of complex systems and/or systems of systems based on a limited quantity of operational effectiveness evaluation data. Operational performance can be enabled by complex correlation of underlying human and system functional activities. Pattern understanding can be used in automated data classification and analysis through use of the adaptive learning system 110. The adaptive learning system 110, such as a deep learning system, can be used toward automated operational effectiveness assessment of systems and the like.

Employment of the adaptive learning system 110 can result in the ability to quickly learn complex relationships between operation effectiveness of systems (e.g., systems of system) and their various technical performance factors. This can also result in the ability to scale processing time linearly with growth in experimentation data. In addition, this can result in the ability to exploit similarly-structured measures of performance across various systems and/or applications which allows for exploitation of synergies between different operational task assessments. Additionally, this can also result in an ability to operate against level two raw data, commonly available by common instrumentation capabilities.

Figure 4:
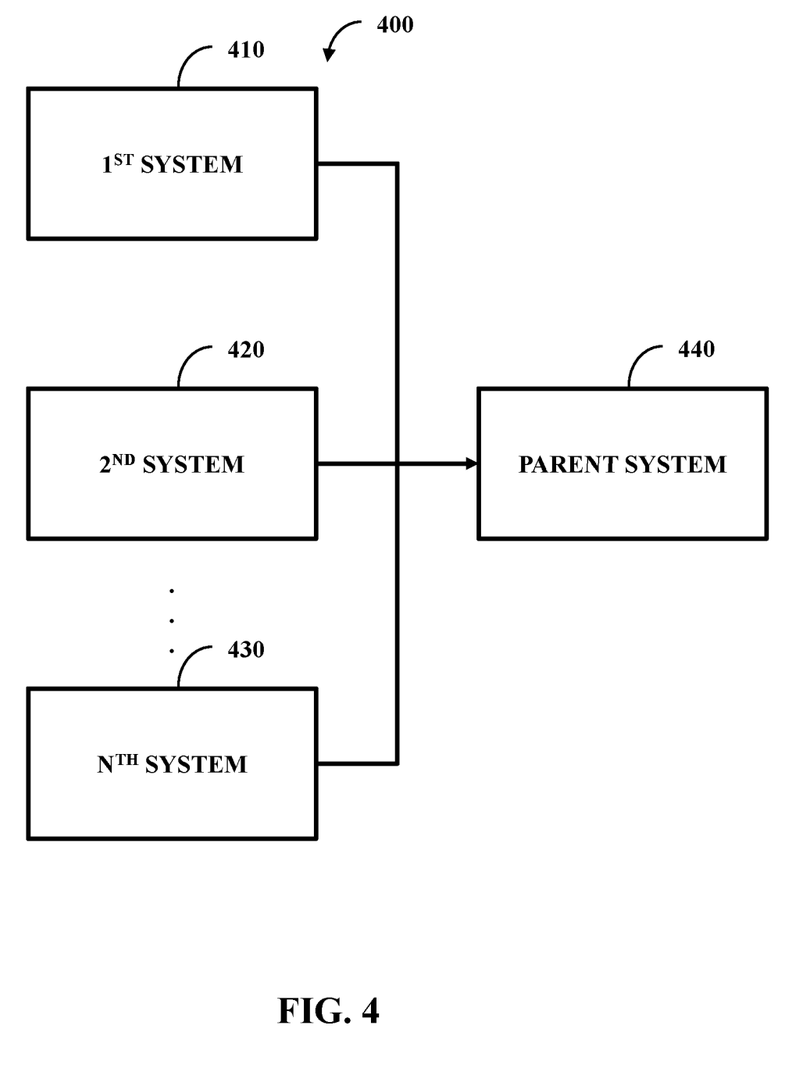
FIG. 4 illustrates one embodiment of a configuration comprising a number of systems and a parent system for system of systems (SoS) operational effectiveness prediction.

FIG. 4 illustrates one embodiment of a configuration 400 comprising a number of systems 410-430 and a parent system 440. The number of systems 410-430 and/or the parent system can be individual adaptive learning systems and/or function as a single learning system. In one embodiment the configuration 400 represents a system of systems configuration, where the systems 410-430 are of the parent system 440 (e.g., are part of the parent system 440 (e.g., are subservices of a complex service), feed data to the parent system 440, etc.). The systems 410-430 can be considered information pipelines while the parent system 440 can comprise or be part of the adaptive learning system 110 of FIG. 1. The systems 410-330 can be subordinate to the parent system 340 and/or supply information to the parent system 440. While shown as separate, the parent system 440 can comprise the systems 410-430. In one embodiment, the set of raw technical performance data 210 of FIG. 2 can be a first set of raw instrumented data that is associated with a first subsystem (e.g., the $1^{st}$ system 410 that is part of the parent system 440). A second subsystem (e.g., the $2^{nd}$ system 420 that is part of the parent system 440), that can be configured to not be identical to the first subsystem, can be associated with a second set of raw instrumented data that is also part of the set of raw technical performance data 210 of FIG. 2. The adaptive learning system 110 of FIG. 1 can be configured to use the first set of raw instrumented data to produce a first operational score and to use the second set of raw instrumented data to produce a second operational score. Additionally, the adaptive learning system 110 of FIG. 1 can be configured to use the first operational score and the second operational score to make the effectiveness prediction.

Figure 5:
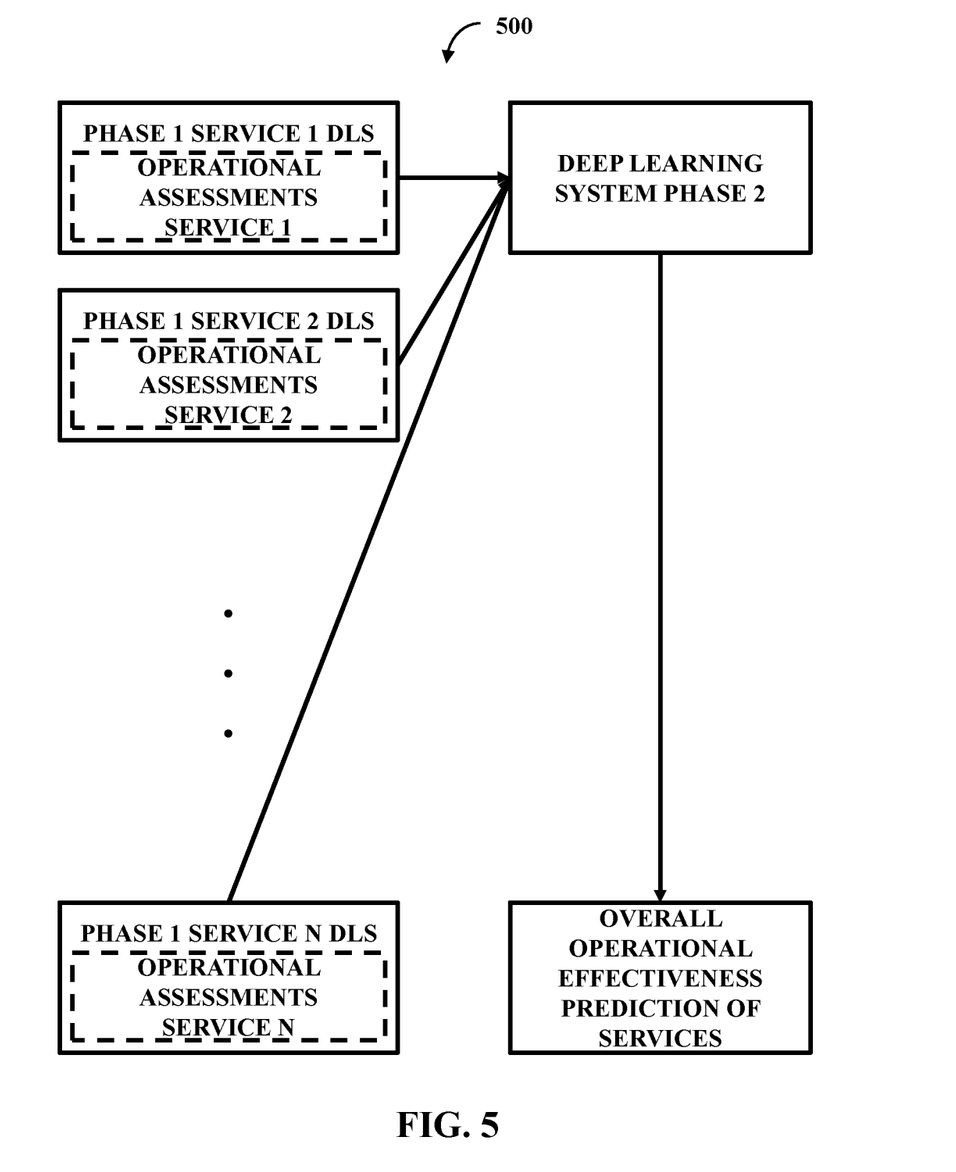
FIG. 5 illustrates one embodiment of an environment of SoS operational effectiveness predicting 2-tiered learning system architecture.

FIG. 5 illustrates one embodiment of an environment 500. Two phases or stages can be defined for the adaptive learning system 110 of FIG. 1 and as such the environment 500 can represent the adaptive learning system 110 of FIG. 1 along with the effectiveness data that is functioning as the overall operational effectiveness prediction. The first phase can predict operational scores for individual services/subsystems and/or provide an intermediate description. These individual services can be implemented as a number of parallel pipelines (1 to N) that each uses a deep learning system (e.g., their own deep learning system). The second phase can take the output from the individual services (e.g., the operational scores and/or the intermediate description). And predict overall operational effectiveness. Phase 1 and phase 2 can be part of the adaptive learning system 110 of FIG. 1.

In one embodiment, the adaptive learning system 110 of FIG. 1 can refine learning behaviors and/or algorithms independently for phase 1 and phase 2. In addition, the adaptive learning system 110 of FIG. 1 can identify and isolate a weak performing pipeline (e.g., a pipeline that is not providing reliably training). The impact of training from this weak performing pipeline can be mitigated (e.g., not used in further training, not used in further training until correct, etc.).

Figure 6:
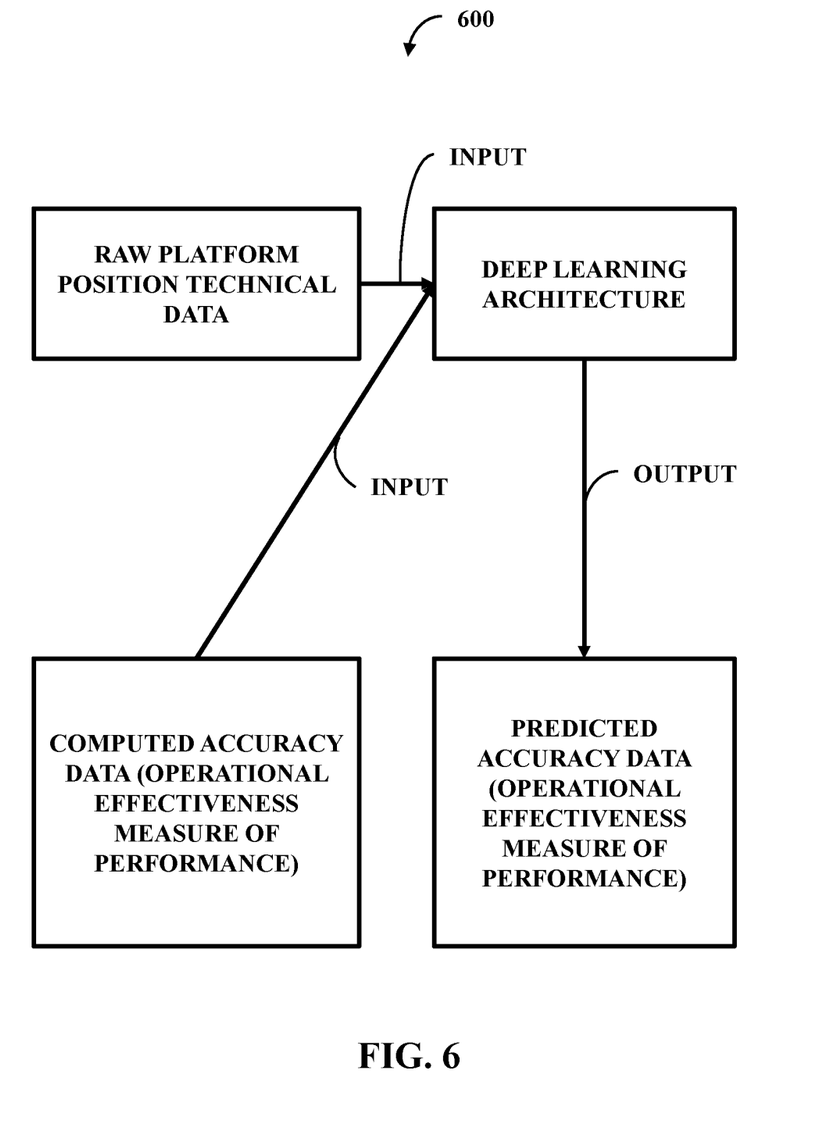
FIG. 6 illustrates one embodiment of an environment in practical application of predicting operational effectiveness of platform position SoS.

FIG. 6 illustrates one embodiment of an environment 600. The environment 600 can be used to validate learning of the adaptive learning system 110 of FIG. 1, such as when implemented as a deep learning architecture. The deep learning architecture can receive raw platform position coordinates/position reports technical data and a first set of accuracy data (e.g., brute-force computed accuracy of platform position given the position and reports) as an input. After training, the deep learning architecture can output a second set of predicted accuracy data given platform locations and platform location reports. The sets of accuracy data can be used to cross-validate such that perceived and actual platform location accuracies (e.g., one brute-force computed and one predicted) are compared to one another. In this way, using the adaptive learning system 110 of FIG. 1, one can predict system accuracy from platform location data and data reflecting function of communication system performance absent further complex brute force computation of accuracy.

Figure 7:
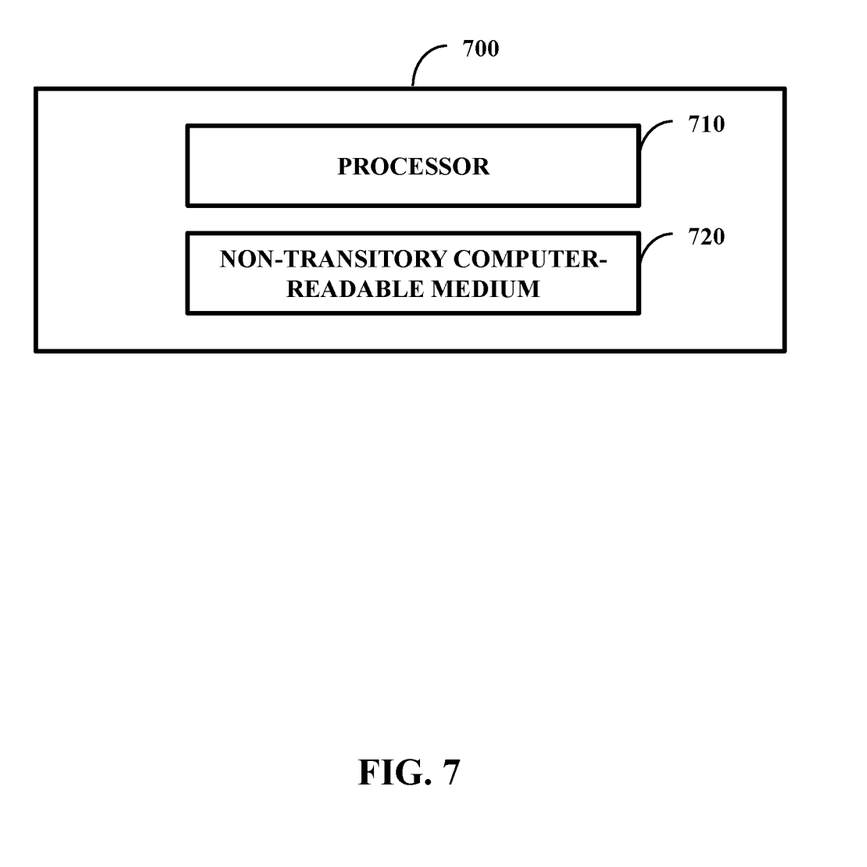
FIG. 7 illustrates one embodiment of a system comprising a processor and a non-transitory computer-readable medium.

FIG. 7 illustrates one embodiment of a system 700 comprising a processor 710 and a non-transitory computer-readable medium 720. In one embodiment the non-transitory computer-readable medium 720 is communicatively coupled to the processor 710 and stores a command set executable by the processor 710 to facilitate operation of at least one component that can perform an aspect disclosed herein (e.g., a validation component configured to validate the adaptive learning system 110 of FIG. 1). In one embodiment, at least one component that can perform an aspect disclosed herein (e.g., a trainer component configured to train the adaptive learning system 110 of FIG. 1) can be implemented, at least in part, by way of non-software, such as implemented as hardware by way of the system 700 or implemented as software retained on the non-transitory computer-readable medium 720. In one embodiment the non-transitory computer-readable medium 720 is configured to store processor-executable instructions that when executed by the processor 710 cause the processor 710 to perform a method disclosed herein (e.g., the method 800, the method 900, and/or the method 1000 discussed below).

Figure 8:
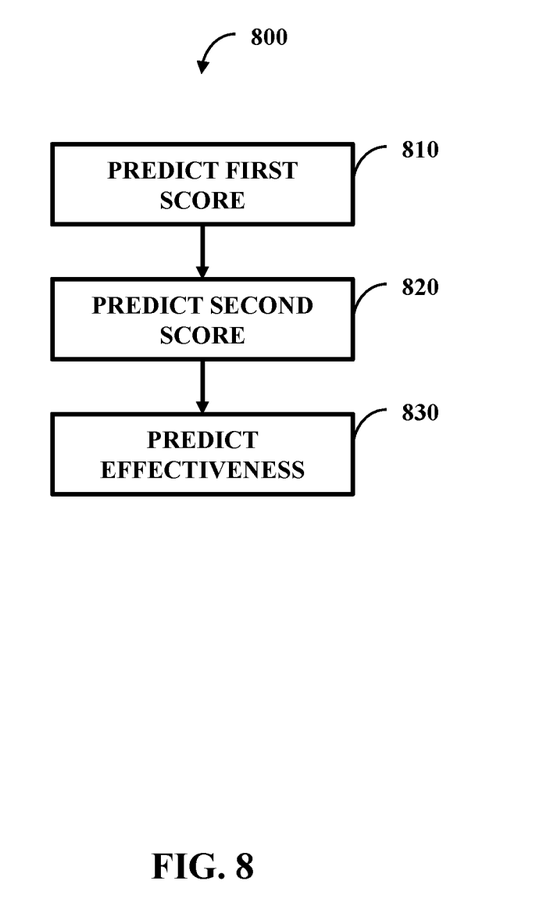
FIG. 8 illustrates one embodiment of a method comprising three actions.

FIG. 8 illustrates one embodiment of a method 800 comprising three actions 810-830. At 810 predicting a first operational score for a first individual service through use of a first service deep learning system can occur. At 820 predicting a second operational score for a second individual service through use of a second service deep learning system that is distinct from the first service deep learning system can occur. At 830 predicting an overall operational effectiveness though use of an operational deep learning system can occur. The overall operational effectiveness can be based, at least in part, on the first operational score and the second operational score produced by their respective learning systems. In one embodiment, the first service deep learning system, the second service deep learning system, and the operational deep learning system are part of the same overall deep learning system or are distinct learning systems (e.g., all three are distinct from one another).

In one embodiment, the first individual service and the second individual service can be on the same hierarchical level or on different hierarchical levels. Examples of being on the same hierarchical level can include equivalent electronic devices that communicate with one another. Being on different hierarchical levels can include a master-slave arrangement where a first device has dominion over a second device.

Figure 9:
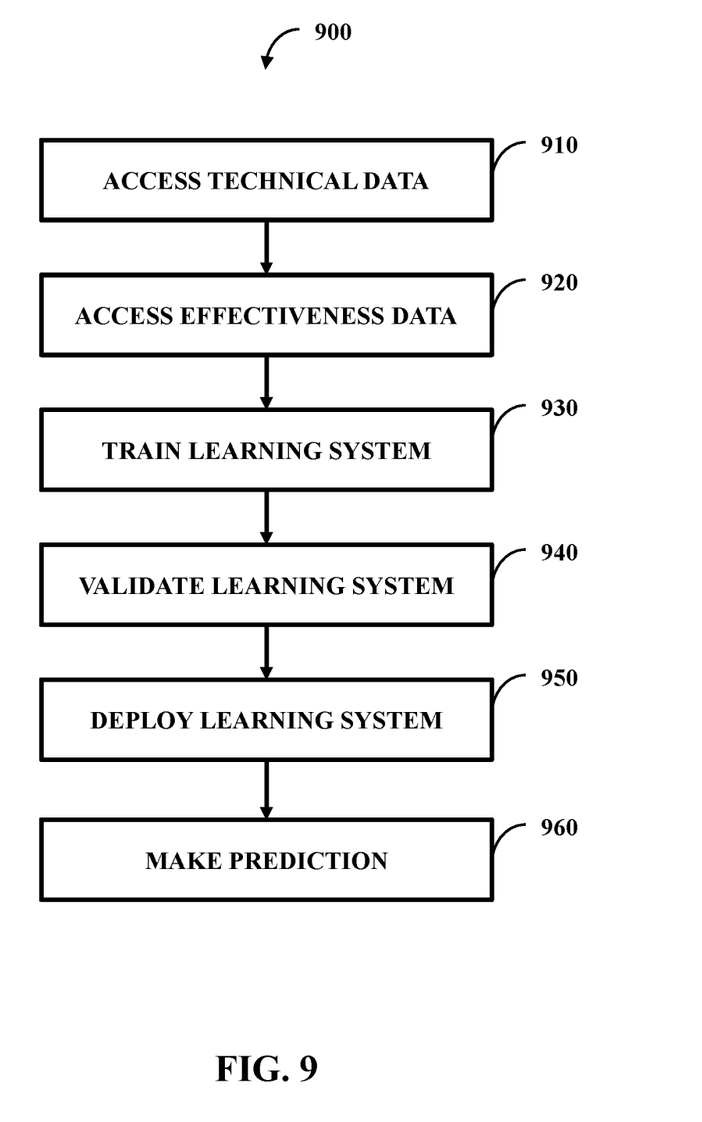
FIG. 9 illustrates one embodiment of a method comprising six actions.

FIG. 9 illustrates one embodiment of a method 900 comprising six actions 910-960. A set of raw technical performance data and a set of actual operational effectiveness data can be accessed at 910 and 920 respectively. This accessing can be of data sent in response to a request, data extracted from available sources, data located in a secure location, etc. Similarly the accessing can include obtaining data, computing data, receiving data, etc.

At 930 training the adaptive learning system 110 of FIG. 1 (e.g., functioning as a deep learning system that employs at least five layers) based on a relationship between at least part of the set of raw technical performance data and the set of actual operational effectiveness data can occur. At 940 validating the adaptive learning system 110 of FIG. 1 can occur after the adaptive learning system is trained at 930 and after successful validation the adaptive learning system 110 of FIG. 1 can be deployed at 950.

In one embodiment, accessing the technical data at 910 can comprise dividing the set of raw technical performance data into a first raw part and the second raw part. Training the adaptive learning system 110 of FIG. 1 at 930 can be training the adaptive learning system 110 of FIG. 1 at 930 based on a relationship between the first raw part and the set of actual operational effectiveness data. Validating the adaptive learning system 110 of FIG. 1 at 940 can be testing the adaptive learning system 110 of FIG. 1 through observation of a predicted operation effectiveness by use of the second raw part. After being trained (e.g., after being trained and validated) the adaptive learning system 110 of FIG. 1 can be deployed at 950. While deployed and/or after being deployed and then un-deployed the adaptive learning system 110 of FIG. 1 can be further trained at 930. At 960 collecting a set of actual technical performance data can take place as well as making an actual operation effectiveness prediction through use of the set of actual technical performance data by way of the adaptive learning system 110 of FIG. 1 while the adaptive learning system 110 of FIG. 1 is deployed. In one example, the set of raw technical performance data (e.g., human produced data, such as from the backpack of the GPS example) is from an initial duration of a test and evaluation event and the set of actual technical performance data (e.g., produced from mathematical calculation, derived, at least in part, from the set of raw technical performance data, etc.) is from a remaining duration of the test and evaluation event.

Figure 10:
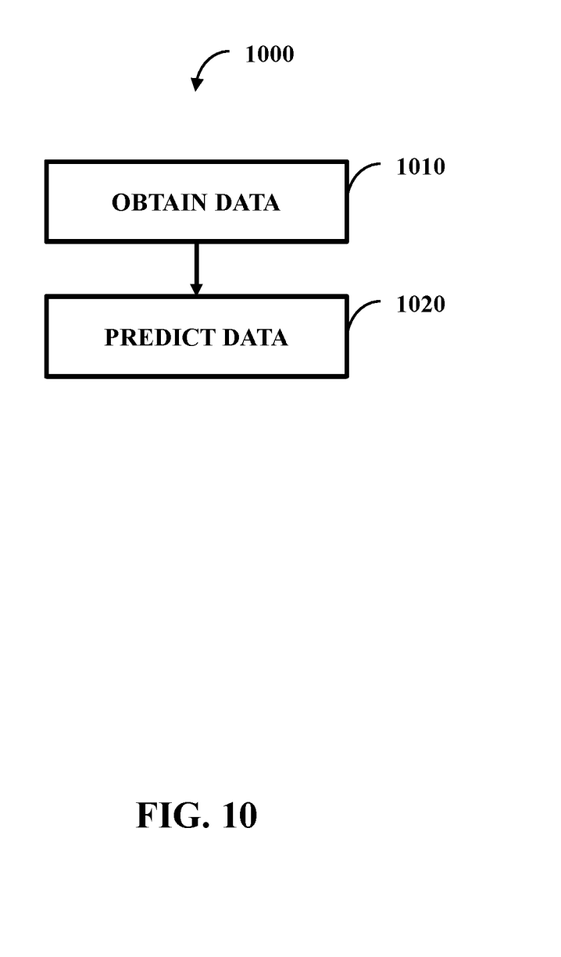
FIG. 10 illustrates one embodiment of a method comprising two actions.

FIG. 10 illustrates one embodiment of a method 1000 comprising two actions 1010 and 1020. At 1010 there is obtaining the set of raw technical performance data 210 of FIG. 2 while at 1020 there is predicting a set of predicted operational assessment data (e.g., set of predicted operational effectiveness assessment data 220 of FIG. 2) based, at least in part, on the set of raw technical performance data 210 of FIG. 2. This prediction can be made by way of a learning system (e.g., the adaptive learning system 110 of FIG. 2). The adaptive learning system 110 of FIG. 1 can be trained from the set of raw technical performance data 120 of FIG. 1 (e.g., set of training technical performance data) with a set of training operational assessment data (e.g., the set of actual operational effectiveness assessment data 130 of FIG. 1) and be a deep learning system.

In one embodiment, the set of training technical performance data is technical performance data from an initial duration of a test and evaluation event while the set of raw technical performance data is technical performance data from a remaining duration of the test and evaluation event. In one embodiment, the set of training operational assessment data is human produced and/or the set of training operational assessment data is produced from mathematical calculation. Using the GPS example above, the set of training operational assessment data (e.g., accuracy level) can be calculated through comparison of the data recorder against what is transmitted and received wirelessly.

What is claimed is:

1. A method, comprising:
predicting a first operational score for a first individual service by way of a first service adaptive learning system;
predicting a second operational score for a second individual service by way of a second service adaptive learning system that is distinct from the first service adaptive learning system; and
predicting an overall operational effectiveness through use of an operational adaptive learning system,
where the overall operational effectiveness is based, at least in part, on the first operational score and the second operational score,
where the first service adaptive learning system is trained from a first set of training technical performance data and a first set of training operational assessment data,
where the first service adaptive learning system is trained from a second set of training technical performance data and a second set of training operational assessment data,
where the first individual service and the second individual service are on the same hierarchical level,
where the first service adaptive learning system is trained prior to predicting the first operational score,
where the first service adaptive learning system is validated after being trained and prior to predicting the first operational score,
where the second service adaptive learning system is trained prior to predicting the second operational score,
where the second service adaptive learning system is validated after being trained and prior to predicting the second operational score,
where the first service adaptive learning system is trained while online,
where the first service adaptive learning system is validated while online,
where the first service adaptive learning system is a first service adaptive deep learning system of at least five layers,
where the second service adaptive learning system is trained while online,
where the second service adaptive learning system is validated while online,
where the second service adaptive learning system is a second service adaptive deep learning system of at least five layers,
where the first set of training operational assessment data is human produced,
where the first set of training technical performance data and the second set of training technical performance data is identical, and
where the first set of training operational assessment data and the second set of training technical performance data is identical.

2. A method, comprising:
predicting a first operational score for a first individual service by way of a first service adaptive learning system;
predicting a second operational score for a second individual service by way of a second service adaptive learning system that is distinct from the first service adaptive learning system; and
predicting an overall operational effectiveness through use of an operational adaptive learning system,
where the overall operational effectiveness is based, at least in part, on the first operational score and the second operational score,
where the first service adaptive learning system is trained from a first set of training technical performance data and a first set of training operational assessment data,
where the first service adaptive learning system is trained from a second set of training technical performance data and a second set of training operational assessment data,
where the first individual service and the second individual service are on the same hierarchical level,
where the first service adaptive learning system is trained prior to predicting the first operational score,
where the first service adaptive learning system is validated after being trained and prior to predicting the first operational score,
where the second service adaptive learning system is trained prior to predicting the second operational score,
where the second service adaptive learning system is validated after being trained and prior to predicting the second operational score,
where the first service adaptive learning system is trained while online,
where the first service adaptive learning system is validated while online,
where the first service adaptive learning system is a first service adaptive deep learning system of at least five layers,
where the second service adaptive learning system is trained while online,
where the second service adaptive learning system is validated while online,
where the second service adaptive learning system is a second service adaptive deep learning system of at least five layers,
where the set of training operational assessment data is produced from mathematical calculation,
where the first set of training technical performance data and the second set of training technical performance data is not identical, and where the first set of training operational assessment data and the second set of training technical performance data is not identical.

\* \* \* \* \*